United States Patent [19]

Lombardi et al.

[11] Patent Number: 4,642,479

[45] Date of Patent: Feb. 10, 1987

[54] POWER DISTRIBUTION DEVICE

[75] Inventors: Steven A. Lombardi, Lake Zurich; David O. Potter, Lake Villa, both of Ill.

[73] Assignee: Motorola, Inc., Schaumburg, Ill.

[21] Appl. No.: 720,124

[22] Filed: Apr. 4, 1985

[51] Int. Cl.⁴ .............................................. H01H 7/00
[52] U.S. Cl. .................. 307/141; 307/141.4; 307/126; 361/89; 361/91; 333/24 R
[58] Field of Search ............ 307/141, 141.4, 126; 361/89, 91; 333/24 R

[56] References Cited

U.S. PATENT DOCUMENTS

| | | |
|---|---|---|
| 3,814,948 | 6/1974 | Schuchmann et al. .......... 307/141 |
| 4,339,696 | 7/1982 | Jabor ................ 307/141 X R |
| 4,429,339 | 1/1984 | Jaeschke et al. .......... 361/91 X R |
| 4,462,069 | 7/1984 | Becky .................. 361/91 X R |
| 4,520,419 | 5/1985 | Locher et al. ............ 361/56 X R |

*Primary Examiner*—William M. Shoop, Jr.
*Assistant Examiner*—Sharon D. Logan
*Attorney, Agent, or Firm*—Steven G. Parmelee

[57] ABSTRACT

A power distribution device having a first input that can be operably connected to a power source, a second input that can be operably connected to an operator controlled switch, and an output for connection to peripheral devices to be powered. The device further includes a first comparator unit for sensing when the operator controlled switch has been closed and for providing an output signal in response thereto, and a second comparator unit that can respond to the output signal created by the first comparator unit to provide a control signal. A power switch unit responds to the control signal and can connect and disconnect the output of the device to the power source input. A delay unit serves to delay the response of the second comparator unit to a change in the output signal state of the first comparator unit. Over voltage protection circuitry protects the circuit and the peripheral devices to be powered from an over voltage supply at the power source input, and reverse voltage protection circuitry protects both the device and the peripheral devices to be powered from a reverse biased power source.

13 Claims, 3 Drawing Figures

4,642,479

POWER DISTRIBUTION DEVICE

TECHNICAL FIELD

This invention relates generally to switch controlled power coupling systems.

BACKGROUND ART

Electrical components typically require the application of electrical power in order to operate correctly. In an electronic control module as utilized to control an internal combustion engine, such power need not be perpetually applied since the engine to be controlled will typically not operate continually. During nonoperation of the engine, such electronic control modules can be powered down to avoid depleting the power source.

To provide this flexibility, one could simply place a switch between the power source and the electronic component to be powered. Unfortunately, this simple solution gives rise to a number of problems. For instance, electronic control modules as mentioned above typically include a microprocessor. Microprocessors ordinarily require a short period of time during which a power down can be correctly instituted. During this period, the microprocessor will often store data in nonvolatile memory and perform other functions to assure a trouble free power up operation.

A simple switch to disconnect power from such a microprocessor will not necessarily allow these functions to be correctly implemented. In addition, such a switch does nothing to protect the microprocessor or other powered components from the problems that can result by incorrectly connecting the power source to the powered component, such as by reversing the polarity of the power source, or by incorrectly applying an over voltage to the powered components. In either of these cases, a simple switch will likely allow the powered components to be temporarily inhibited or permanently disabled.

One prior art attempt to avoid these problems can be seen in FIG. 1. In this prior art structure, a power source (A) connects to a microprocessor (B) through a first switch (C). The first switch (C) can be controlled by either of two switches, an ignition switch (D) or a microprocessor controlled switch (E). The ignition switch (D) can be closed to apply power from the power source (A) to the control input of the first switch (C), thereby causing the first switch (C) to close and apply power from the power source (A) to the microprocessor (D). Once the microprocessor (B) has begun normal operation, the microprocessor (B) can close the microprocessor controlled switch (E) and thereby provide its own control signal to the first switch (C).

The microprocessor (B) also has means (F) to determine whether the ignition switch (D) remains closed or open. Upon opening the ignition switch (D), the microprocessor (B) enters a power down phase and attends to its various power down functions. Once these are completed, the microprocessor terminates its control signal to the microprocessor controlled switch (E). The first switch (C) then opens and uncouples the microprocessor (B) from the power source (A). Under normal operating conditions this prior art structure did not have a quiescent voltage drain.

This structure did not resolve all of the problems set forth above. Further, there were no specific assurances that the system described would actually power down unless other precautions were taken, such as providing watch dog circuits or the like.

There therefore exists a need for a power distribution device that can be reliably and economically utilized to selectively connect and disconnect a power source from one or more electrical components as desired. Such a device should not impose a voltage drain on the power source during its quiescent operating mode. In addition, such a device should have means for providing an adequate but determinate delay period when decoupling power to ensure that a microprocessor will have adequate time to effectuate a controlled power down. Further, such a device should provide both over voltage protection and protection against an application of a reverse biased power source.

These needs and others are substantially met through provision of the power distribution device described in this specification. This device includes generally a first input for operably connecting to a power source, a second input for operably connecting to a switch, and an output for operably connecting to the electrical components to be powered. The device also includes a first unit for sensing when the operator controlled switch has a predetermined conductive state, and a second unit that can respond to the first unit to provide a control signal. A power switch unit responds to this control signal to selectively connect or disconnect the device output from the power source input.

Finally, the device includes a delay unit for delaying the response of the second unit to a change in the output signal state of the first unit.

In one embodiment of the device, the first unit can be provided through use of a comparator having both inputs connected to sense the conductive state of the operator controlled switch. The second unit can also be implemented by use of a comparator, with this comparator connected to sense the output of the first comparator.

The power switch unit can be implemented through use of a transistor having its base connected to the output of the second comparator and its power terminals connected in series with the coil of a relay switch. The relay switch can thereby be manipulated to selectively connect and disconnect the power source input from the device output.

The delay unit can be comprised of a capacitor that operably connects between the output of the first comparator and the pertinent input of the second comparator.

Upon closing the operator controlled switch, the two comparator units power up. The first comparator then senses the closed state of the switch and provides an output signal. This output signal causes the second comparator unit to provide a drive signal to the power switch unit, thereby causing the relay associated therewith to close. Closing of the relay switch then connects the device output to the power source input.

Upon opening the operator controlled switch, the output of the first comparator will fall low. The delay unit capacitor, however, continues to provide an input signal to the second comparator for a specific duration of time. During this duration of time, the second comparator will continue to drive the power switch unit to enable a microprocessor connected to the device output to power down in an appropriate manner.

When the delay unit capacitor has become discharged, the second comparator output will go low, thereby allowing the power switch unit relay to open and disconnect power from the powered components.

The device also includes overvoltage protection. A Zener diode has been provided that will break down and conduct at a specified overvoltage level or above and cause a switch to close that will effectively inhibit the power switch unit such that the relay cannot be opened or maintained in a closed configuration.

The device also includes reverse voltage protection in the form of a plurality of diodes that are positioned to prevent an application of reverse biased voltage to the device circuitry. In this way, both the circuitry of the device itself, and the components of the supplied system, will be protected.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
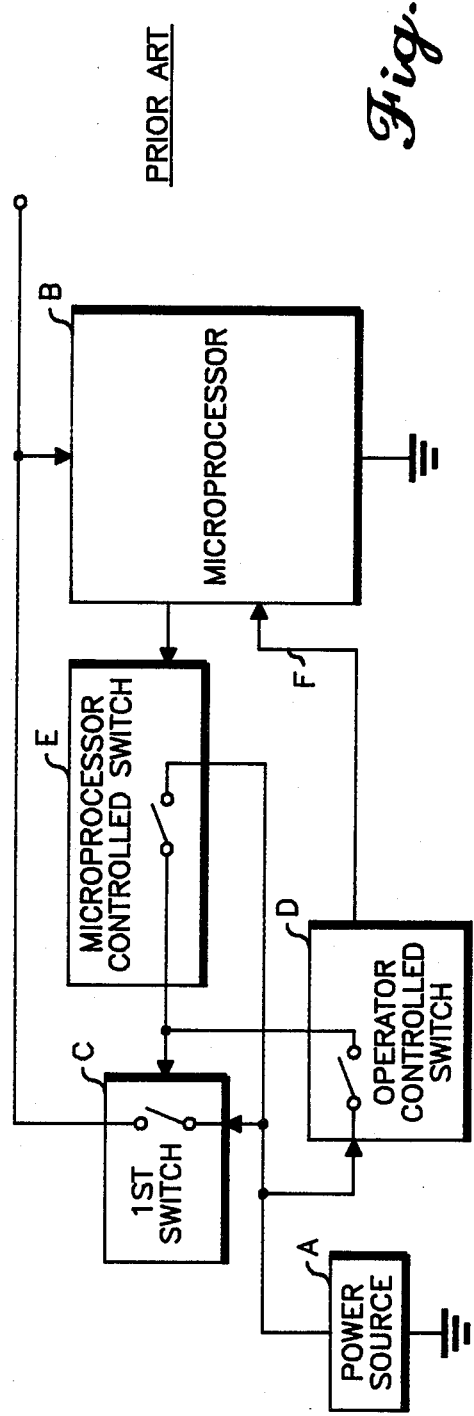
FIG. 1 comprises a block diagram depiction of a prior art device.
Figure 2:
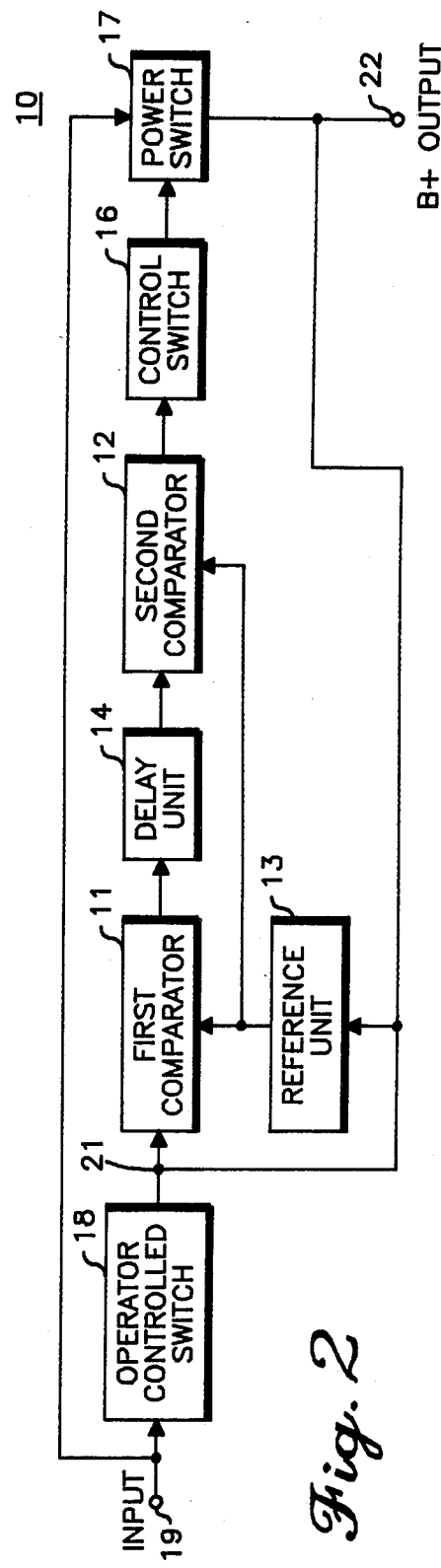
FIG. 2 comprises a block diagram view of a power distribution device as comprised in conformance with the invention.

Referring now to the drawings, and in particular to FIG. 2, the power distribution device of the invention can be seen as depicted generally by the numeral 10. The device (10) includes generally a first comparator (11), a second comparator (12), a reference unit (13), a delay unit (14), a control switch (16), and a power switch (17). The device (10) can be seen as configured in conjunction with an operator controlled switch (18), such as an ignition switch.

The device (10) has a first input (19) for operably connecting to a power source such as a battery. The device (10) also has a second input (21) for connecting to the operator controlled switch (18). Finally, the device (10) includes an output (22) for providing a conductive path to the power source input (19).

With continued reference to FIG. 2, the reference unit (13) can draw power from either the second input (21) or the power source output (22), depending upon which of these may offer power at any given moment in time. The reference unit (13) provides a reference signal to both the first comparator (11) and the second comparator (12).

These generally referred to components will now be described in more detail in seriatim fashion.

Figure 3:
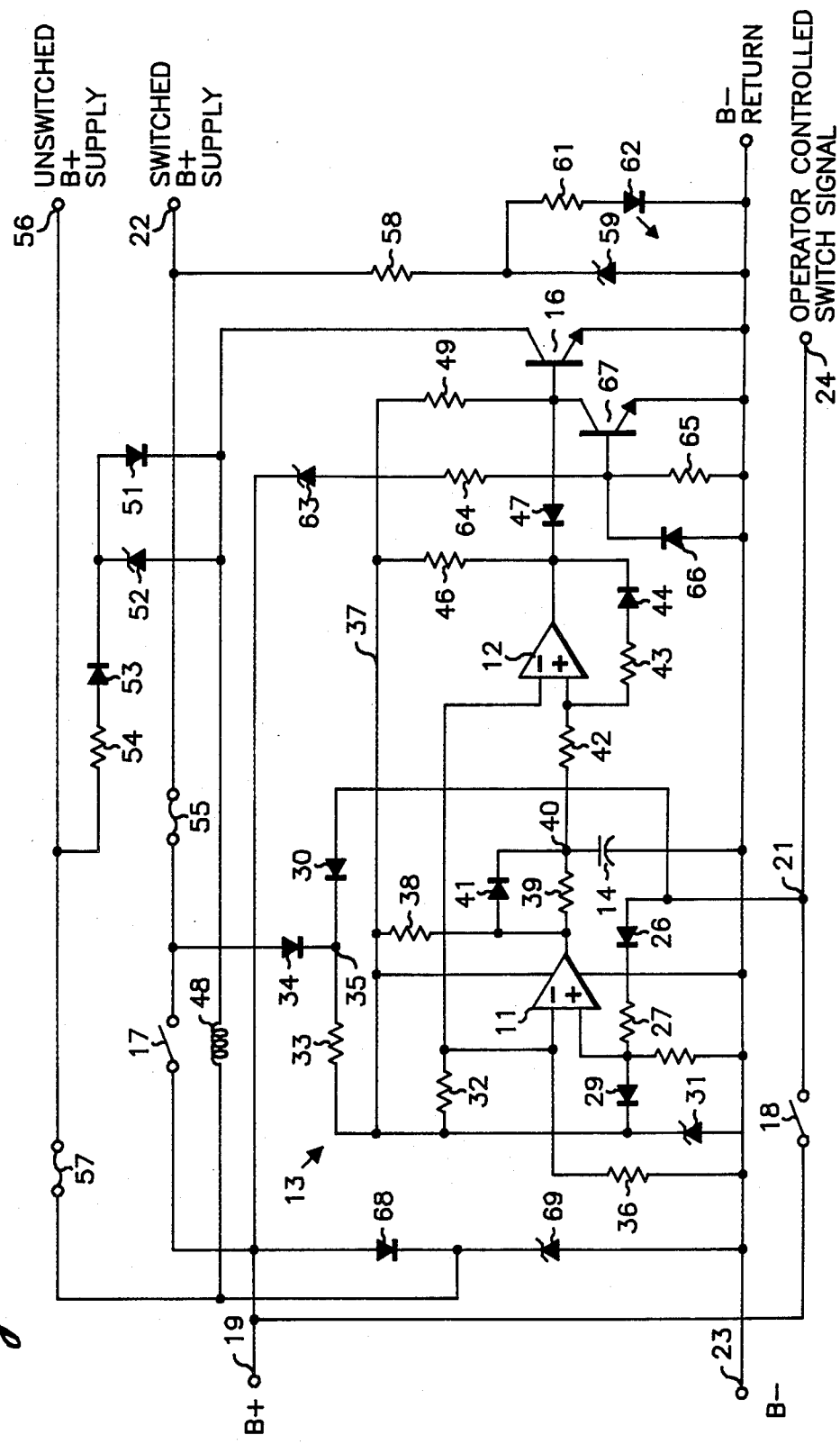
FIG. 3 comprises a schematic diagram view of the power distribution device.

Referring now to FIG. 3, the first input (19) may be operably connected to the positive terminal of a battery (B+). Similarly, a ground port (23) may be connected to the negative terminal of the battery (B−).

The positive terminal of the battery also connects through an operator controlled switch (18) to the second input (21) of the device (10). If desired, an operator controlled switch signal output (24) can be provided such that other devices or components could make use of this signal if so desired.

The second input (21) connects through a first diode (26) as provided through use of a IN4002 to a 2.7K ohm resistor (27) that connects: (a) to the noninverting input of the first comparator (11) (as provided through use of an LM-2903); (b) to a grounded 10K ohm resistor (28); and (c) through a IN4148 diode (29) to a grounded 5.1 volt 1 watt Zener diode (31), the cathode of which comprises a power bus (37). The second input (21) also connects through yet another IN4148 diode (30) to a reference unit power input node (35), the purpose of which will be described in more detail below.

The power bus (37) noted above connects: (a) through a 10K ohm resistor (32) to the inverting input of the first comparator (11) and to the inverting input of the second comparator (12); and (b) through a 1.2K ohm resistor (33) to the reference unit power input node (35). Remaining connections to the power bus (37) will be set forth below as appropriate.

The inverting input of the first comparator (11) also connects through a 15K ohm resistor (36) to ground. The output thereof connects: (a) through a 10K ohm resistor (38) to the power bus (37); and (b) through a parallel coupled 820K ohm resistor (39) and a IN4148 diode (41) to an output node (40). The output node (40) connects: (a) through a 10K ohm resistor (42) to the noninverting input of the second comparator (12) (which may also be comprised of an LM-2903); and (b) to a grounded 2.2 microfarad capacitor that comprises the delay unit (14).

The noninverting input of the second comparator (12) connects through a series connected 100K ohm resistor (43) and IN4148 diode (44) to the output thereof. The output of the second comparator (12) connects: (a) through a 10K ohm resistor (46) to the power bus (37); and (b) through a IN4148 diode (47) to the base of a TIP-111 transistor that comprises the control switch (16). The emitter of this transistor (16) connects to ground and the collector connects in series with the relay coil (48) of the power switch (17). The base of this transistor connects through a 10K ohm resistor (49) to the power bus (37).

The collector of the control switch transistor (16) also connects to a parallel coupled LED (51) such as an ESBR5701 and a 4.7 volt 1 watt Zener diode (52), the opposing terminals of which connect through a series connected IN4148 diode (53) and a 180 ohm 2 watt resistor (54) to an unswitched power source supply line (56) that connects through a fuse (57) and a diode (68) to the power source input (19).

The power output (22) of the device (10) connects: (a) through a 25 ampere fuse (55) to the power switch (17); (b) through a 180 ohm resistor (58) to a parallel grounded 4.7 volt 1 watt Zener diode (59) and a series connected 180 ohm resistor (61) and an ESBR5701 LED (62); and (c) through a IN4148 diode (34) to the power input node (35).

The power source input (19) also connects through a 36 volt 1 watt Zener diode (63) to a series connected 10K ohm and 4.7K ohm resistors (64 and 65). A IN4148 diode (66) connects in parallel with the latter resistor (65), and the base of a MRSA06 transistor (67) connects between the two resistors (64 and 65). The emitter of this transistor (67) connects to ground and the collector connects to the base of the control switch transistor (16). Hence, upon an over application of voltage at the power source input (19), the Zener diode (63) will break down and conduct, thereby switching on the transistor (67) to effectively ground the base drive of the control switch transistor (16) and inhibit its operation.

Additional over voltage protection has been provided through use of a series connected 6 ampere button diode (68) and a second 36 volt Zener diode (69) that connect between the power source input (19) and ground. In addition, the unswitched power source supply line (56) connects directly to the cathode of the latter Zener diode (69). This protects against an over voltage supply on the unswitched said supply line (56).

So configured, the device (10) will operate as described above to sense the closing of the operator controlled switch (18) and thereby provide an appropriate control signal to the power switch (17) to cause it to close and connect the output (22) to the power source input (19). Furthermore, upon opening the operator controlled switch (18), the device (10), through a controlled discharge of the delay unit capacitor (14) and the provision of an appropriate reference signal through the reference unit (13), will continue to provide power to the microprocessor or other supplied components for an additional, though determinative, period of time to allow proper power down functions to be effectuated. In addition, the circuit includes components designed to prevent damage either to the device (10) or to the supplied components by an over supply of voltage at the power source input (19), and further include a number of diodes that protect against an application of a reverse biased power source.

It will be evident to those skilled in the art that numerous modifications and changes could be made with respect to the circuit described to effectuate various needs and requirements, without departing from the spirit of the invention as generally set forth. Therefore, the scope of the invention should not be considered as being limited to the specific embodiments set forth, except as such limitations may be specifically set forth in the claims.

We claim:
1. A power distribution device having:
 (a) a first input for operably connecting to a power source;
 (b) a second input for operable connection to a switch having selectively variable conductive states;
 (c) an output;
 (d) first means for sensing when said switch has a predetermined conductive state and for providing an output signal in response thereto;
 (e) second means responsive to said output signal of said first means for providing a control signal;
 (f) power switch means responsive to said control signal for selectively connecting and disconnecting said output to said first input;
 (g) delay means for delaying said second means response to a change in said output signal; and
 (h) reference means for providing a reference signal to said first means to faciltate the provision of said output signal, wherein said reference means includes a power input for connection to said power switch means such that said reference means can receive operating power therefrom and wherein said second means receives said reference signal as well to thereby facilitate provision of said control signal.

2. The device of claim 1 wherein said delay means thereby functions to delay a response by said second means to a change of said switch's conductive state.

3. The device of claim 2 wherein said delay means thereby functions to delay disconnection of said first input to said output.

4. The device of claim 1 wherein said switch has a first pole connected to said second input.

5. The device of claim 4 wherein said switch includes a second pole that may be operably coupled to said power source.

6. The device of claim 1 wherein said device further includes a power bus to provide appropriate power to said first and second means.

7. The device of claim 6 wherein said power bus includes at least one Zener diode.

8. A power distribution device having:
 (a) a first input for operably connecting to a power source;
 (b) a second input for operable connection to a switch having selectively variable conductive states;
 (c) an output;
 (d) first means for sensing when said switch has a predetermined conductive state and for providing an output signal in response thereto;
 (e) second means responsive to said output signal of said first means for providing a control signal;
 (f) power switch means responsive to said control signal for selectively connecting and disconnecting said output to said first input, wherein said power switch means includes a relay and a transistor, the power terminals of which operably connect to said relay to selectively cause said relay to become energized and de-energized; and
 (g) delay means for delaying said second means response to a change in said output signal.

9. A power distribution device having:
 (a) a first input for operably connecting to a power source;
 (b) a second input for operable connection to a switch having selectively variable conductive states;
 (c) an output;
 (d) first means for sensing when said switch has a predetermined conductive state and for providing an output signal in response thereto;
 (e) second means responsive to said output signal of said first means for providing a control signal;
 (f) power switch means resonsive to said control signal for selectively connecting and disconnecting said output to said first input;
 (g) delay means for delaying said second means response to a change in said output signal; and
 (h) over voltage protection means comprising:
  (i) over voltage sensing means comprising a Zener diode for sensing an application of excessive voltage at said first input and for producing an over voltage signal in response thereto;
  (ii) over voltage switch means for responding to said over voltage signal and for providing an over voltage signal control signal, said over voltage switch means including a transistor that can be switched on by said Zener diode to divert said second means control signal from said power switch means; and
  (iii) inhibit power switch means responsive to said over voltage signal control signal for inhibiting said power switch means for connecting said output to said first input.

10. The device of claim 1 and further including a second output that non-switchably connects to said first input.

11. The device of claim 1 and further including reverse voltage protection means for isolating said device from a reverse biased power source as applied to said first input.

12. The device of claim 11 wherein said reverse voltage protection means includes a plurality of diodes.

13. A power distribution device having:
(a) a first input for operable connection to a power source;
(b) a second input for operable connection to an operator controlled switch having selectively variable conductive states;
(c) an output;
(d) first comparator means for sensing when said switch has a predetermined conductive state and for providing an output signal in response thereto;
(e) second comparator means responsive to said output signal of said first means for providing a control signal;
(f) power switch means responsive to said control signal for selectively connecting and disconnecting said output to and from said first input;
(g) delay means for delaying said second comparator means response to a change in said output signal;
(h) reference means for providing a reference signal to said first comparator means and to said second comparator means; and
(i) power bus means comprising a Zener diode for providing power to said first comparator means, said second comparator means, and said reference means, said power bus means having an input for receiving power from said second input and from said output.

* * * * *